United States Patent
Sarashina

(10) Patent No.: US 8,254,340 B2
(45) Date of Patent: Aug. 28, 2012

(54) CODE DIVISION MULTIPLEX COMMUNICATION SYSTEM

(75) Inventor: Masahiro Sarashina, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 875 days.

(21) Appl. No.: 12/320,242

(22) Filed: Jan. 22, 2009

(65) Prior Publication Data
US 2009/0220232 A1   Sep. 3, 2009

(30) Foreign Application Priority Data
Feb. 29, 2008   (JP) ................. 2008-049183

(51) Int. Cl.
*H04B 7/216*   (2006.01)
(52) U.S. Cl. ........................ 370/335; 370/342
(58) Field of Classification Search .......... None
See application file for complete search history.

(56) References Cited

U.S. PATENT DOCUMENTS

| 6,285,666 | B1 | 9/2001 | Suzuki | |
|---|---|---|---|---|
| 2005/0030926 | A1* | 2/2005 | Qian et al. | 370/335 |
| 2008/0080472 | A1* | 4/2008 | Bertrand et al. | 370/344 |

FOREIGN PATENT DOCUMENTS

| JP | 07-123124 A | 5/1995 |
|---|---|---|
| JP | 10-163995 A | 6/1998 |
| JP | 2007-228134 | 9/2007 |

OTHER PUBLICATIONS

Ohnishi et al., 'Isanetto PON shisutem' (Ethernet PON system), Fujikura Giho, No. 102, Apr. 2002, pp. 18-21.
Ashi et al., 'PON Based All Fiber-Optic Access System for High-speed Multimedia Services', Hitachi Review, vol. 48, No. 4, 1999, pp. 229-233.

* cited by examiner

*Primary Examiner* — Jianye Wu
(74) *Attorney, Agent, or Firm* — Rabin & Berdo, P.C.

(57) ABSTRACT

A code division multiplex (CDM) communication system transmits frames including a preamble and its end bit pattern followed by a CDM signal and its end bit pattern in respective time slots. A clock recovery device at the receiving end recovers a clock signal from the preamble during the preamble time slot and continues to output the clock signal in free run mode during the CDM signal time slot. The clock signal is used to gate the output of a decoder that decodes the received signal, so that the decoded CDM signal is output as a received data signal. The preamble is a bi-level signal, so an ordinary clock recovery device can be used.

6 Claims, 8 Drawing Sheets

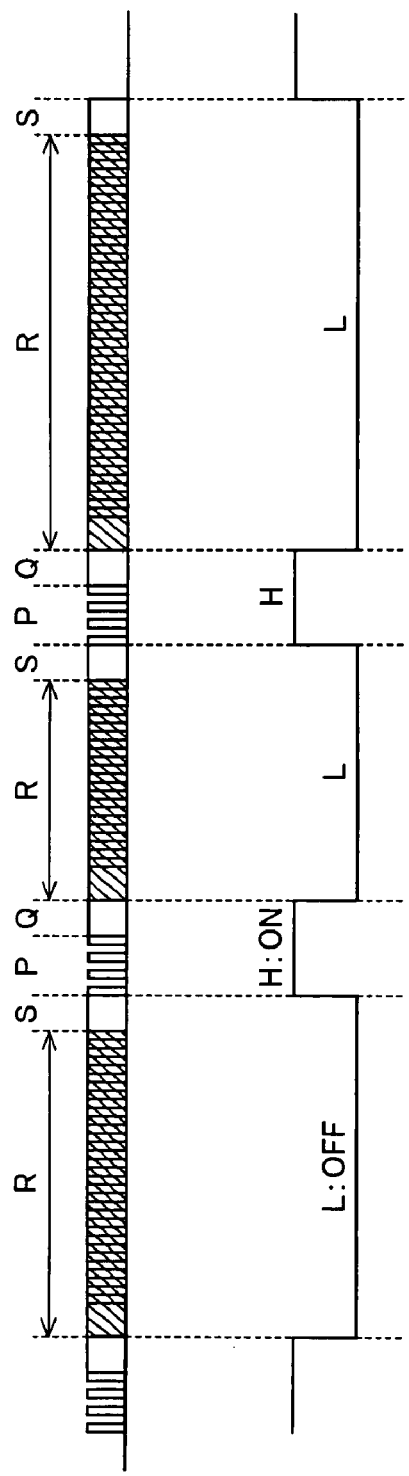

CODE DIVISION MULTIPLEX COMMUNICATION SYSTEM

BACKGROUND OF THE INVENTION

1. Field of the Invention

The present invention relates to a code division multiplex (CDM) communication system.

2. Description of the Related Art

Bidirectional optical communication can be conducted by linking a network operator and a plurality of subscribers through a passive optical network (PON). In PON terminology, the signal transmitting and receiving apparatus on the network operator's side of the network is called an optical line terminal (OLT), and the signal transmitting and receiving units on the subscribers' side of the network are called optical network units (ONUs).

A PON system has a star network topology centered on a passive optical coupler (star coupler) that couples the single optical transmission path leading to the OLT to the plurality of optical transmission paths leading to the ONUs. The main advantage of a PON system is that by sharing the optical transmission path to the OLT among a plurality of subscribers, it can reduce system equipment costs. General descriptions of PON systems can be found in Ohnishi et al., 'Isanetto PON shisutem' (Ethernet PON system), *Fujikura Giho*, No. 102, April 2002, pp. 18-21, and Ashi et al., 'PON Based All Fiber-Optic Access System for High-speed Multimedia Services', *Hitachi Review*, Vol. 48, No. 4, 1999, pp. 229-233.

When ONUs are referred to in the following description, it will be understood that they are a group of ONUs connected through a single passive optical coupler to a single OLT. Communication between the OLT and N ONUs will also be referred to as 1-to-N communication, where N is an integer greater than one. Communication from the OLT to the ONUs will be referred to as downstream communication, and communication from the ONUs to the OLT will be referred to as upstream communication.

The conventional optical access network systems described by Ohnishi et al. and Ashi et al. employ time division multiplexing (TDM), and identify signals transmitted from individual subscribers by controlling the time slots in which they are transmitted. PON optical access network systems may also employ code division multiplexing (CDM), which offers a variety of advantages. A PON system using CDM will also be referred to below as a CDM-PON system.

In CDM communication, the transmitter encodes a signal to be transmitted, and the receiver decodes the received signal by using the same code as in the transmitter. One of the advantages of CDM transmission is its inherent security, in that all communication is encoded with a key shared by the transmitter and receiver (the code itself is the key). Another advantage of CDM transmission is that the multiplexed signals are all transmitted at the same time, enabling a large amount of data to be transferred while conserving communication resources such as wavelengths and time slots. Tamai et al. describe an exemplary CDM-PON system in Japanese Patent Application Publication No. 2007-228134 and disclose a ranging method by which signal timing is adjusted to compensate for the different distances between the OLT and the individual ONUs.

A CDM-PON communication system requires clock signals for ranging, decoding, gating, and other operations. TDM transmission and receiving systems generally extract clock signals from TDM signals by detecting the modulation frequency of the TDM signal. The clock signal is extracted by a device termed a clock data recovery (CDR) device. CDR devices using a phase locked loop (PLL) are well known.

A TDM signal, however, is a bi-level digital signal, whereas a CDM signal is a multi-level signal with more than two levels. Conventional CDR devices are designed to operate with bi-level signals and cannot readily recover clock signals from CDM signals.

Although CDR generally refers to both clock and data recovery, CDR is sometimes used to refer only to clock recovery, and that usage will be followed herein.

SUMMARY OF THE INVENTION

An object of the present invention is to provide a CDM communication system in which a clock signal can be recovered by a conventional clock recovery device designed to recover a clock signal from a bi-level digital signal without major alteration of the conventional CDM communication system configuration.

This invention arises from the observation that to use a PLL to recover a clock signal from a transmitted signal, it is not necessary to have the PLL circuit track the phase of the transmitted signal continuously; it suffices to track the transmitted signal phase intermittently and let the PLL run free at other times, provided that tracking resumes before the clock phase drifts outside the jitter margin of the communication system. If the transmitted signal has bi-level intervals interspersed frequently enough between multi-level CDM signal portions, it should be possible to use a conventional PLL clock recovery device to recover a clock signal from the bi-level intervals, and decode the CDM signals in synchronization with the clock signal while the PLL runs free.

The state in which the PLL circuit is tracking the phase of the transmitted signal will be referred to below as the tracking mode. The state in which the PLL circuit is running free will be referred to as the free run mode.

To obtain a CDM communication system capable of decoding a CDM signal in the free run mode and recovering a clock signal in the tracking mode as described above, the transmitting apparatus in the CDM communication system is configured to generate frames including a bi-level preamble signal and a multi-level CDM signal. The receiving apparatus recovers a clock signal from the preamble signal and uses the recovered clock signal to decode the CDM signal.

In more detail, the invention provides a novel CDM communication system having the following configuration.

The novel CDM communication system comprises a transmitting apparatus and a receiving apparatus. The transmitting apparatus includes a plurality of frame generators and a frame combiner. The receiving apparatus includes a clock signal extractor and a CDM signal processor.

In the transmitting apparatus, the frame generators packetize or 'frame' respective data signals to generate and output respective frames. The frame combiner combines the frames output from the frame generators to generate and output a CDM signal frame including a preamble signal, followed in sequence by a preamble signal end bit pattern, a CDM signal, and a CDM signal end bit pattern.

In the receiving apparatus, the clock signal extractor receives the CDM signal frame and recovers a clock signal from the preamble signal. The CDM signal processor decodes the CDM signal and recovers the received signal data.

Each of the frame generators in the transmitting apparatus may comprise a header adder, a first first-in first-out (FIFO) buffer, a preamble signal adder, an enable signal generator, and an encoder. The enable signal generator generates and outputs an enable signal that enables and disables the encoder.

The header adder adds a header to the data signal. The first FIFO buffer reserves time slots for the preamble signal and the end bit patterns. The preamble signal adder adds the preamble signal and its end bit pattern to the header and data signal to generate a non-encoded signal. The encoder receives the non-encoded signal and the enable signal, encodes the header and data signal, and generates and outputs the frame.

The encoding enable signal generator may comprise a data analyzer, a header slot adder, and a second FIFO buffer. The data analyzer determines the duration of a data segment on the time axis. The header slot adder adds the duration of the header to determine the duration during which the enable signal remains in the enabling state. The second FIFO buffer adjusts the output timing of the enable signal.

The clock signal extractor in the CDM signal receiving apparatus operates in the tracking mode to recover the clock signal from the preamble time slot of the CDM signal frame, and operates in a free run mode by continuing to output the clock signal during at least the CDM signal time slot.

The clock signal extractor has a phase lock processing unit preferably comprising a phase comparator, a high frequency or radio frequency (RF) switch, a loop filter, a voltage controlled oscillator (VCO), and a frequency divider. The phase comparator, loop filter, VCO, and frequency divider are interconnected to form a PLL in which the phase comparator supplies an output signal to the loop filter, the loop filter supplies a control voltage to the VCO, and the VCO outputs the recovered clock signal.

A bit pattern identifying unit in the clock signal extractor generates a mode switching signal that assumes a first state on detection of the CDM signal end bit pattern and a second state on detection of the preamble signal end bit pattern. The mode switching signal is supplied to the RF switch. The RF switch halts signal output from the phase comparator to the loop filter when the mode switching signal is in the second state and resumes signal output from the phase comparator to the loop filter when the mode switching signal returns to the first state.

As the transmitting apparatus outputs successive CDM signal frames, the clock signal extractor in the receiving apparatus recovers a clock signal from the preamble signals in the frames. The CDM signal processor recovers the received signal data from the CDM signals.

The CDM signal processor is similar to the CDM signal processors already used in conventional CDM communication systems, so the received signal data can be recovered without major alteration of the conventional CDM signal processor configuration. In addition, since the preamble signal in the CDM signal frame is a bi-level signal, the clock signal can be recovered by a commercially available CDR device.

The frame generator configuration, comprising a header adder, a first FIFO buffer, a preamble signal adder, an encoding enable signal generator, and an encoder, enables the header and transmit data to be encoded without encoding the preamble. The header is added to the data signal by the header adder, the time slot for the preamble signal is reserved by the first FIFO buffer, the encoding process is enabled and disabled by the enable signal, and the header and data signal are encoded in the encoder.

The encoding enable signal generator configuration, comprising a data analyzer, a header slot adder, and a second FIFO buffer, enables the encoding enable signal to be correctly timed, even if the data have variable length. The data analyzer determines the duration of the data that will be included in a frame. The header slot adder adds the header duration to obtain the duration for which the enable signal must be in the enabling state. The second FIFO buffer adjusts the output timing of the enable signal so that the enabling state coincides with the header and data signal as received by the encoder.

As a result, the header and the data signal are encoded while the preamble signal and end bit patterns remain non-encoded. The non-encoded portions are identical in all frames. Accordingly, when the frames output from the frame generators are combined by the frame combiner, their non-encoded portions become bi-level signals in the combined frame.

The CDM signal end bit pattern may be specifically added by, for example, the preamble signal adder, or it may simply be a non-encoded interval in which no signal is present. The CDM signal end bit pattern may have a fixed length, or it may have a variable length to absorb variations in the length of the data signal, so that all frames have the same length.

If the preamble length and frame length are appropriately selected, the PLL circuit in the clock signal extractor will be able to maintain phase lock from one preamble to the next even while operating in the free run mode. More specifically, in the free run mode, the phase of the clock signal output by the VCO in the PLL circuit will not drift so far from the phase established by the preamble that the CDM signal processor cannot decode the CDM signal.

The clock signal extractor configuration, comprising a phase lock processing unit and bit pattern identifying unit, makes it possible to switch the phase lock processing unit between the tracking mode and the free run mode at the appropriate times. That is, the tracking mode begins upon detection of the CDM signal end bit pattern in one frame, and the free run mode begins upon detection of the preamble end bit pattern in the next frame. In the tracking mode, the RF switch in the phase lock processing unit passes the output signal of the phase comparator to the loop filter, which adjusts the control voltage supplied to the VCO so as to lock the clock signal output by the VCO in phase with the preamble signal. When the free run mode begins and the loop filter ceases to receive the signal output from the phase comparator, the loop filter holds the control voltage fixed at its current level. The VCO therefore continues to operate with the same frequency and phase while the CDM signal is being decoded and the received signal data are being recovered.

BRIEF DESCRIPTION OF THE DRAWINGS

In the attached drawings:

FIGS. 8A and 8B are waveform diagrams schematically illustrating the switching of operating modes of the phase lock processing unit.

DETAILED DESCRIPTION OF THE INVENTION

Figure 1:
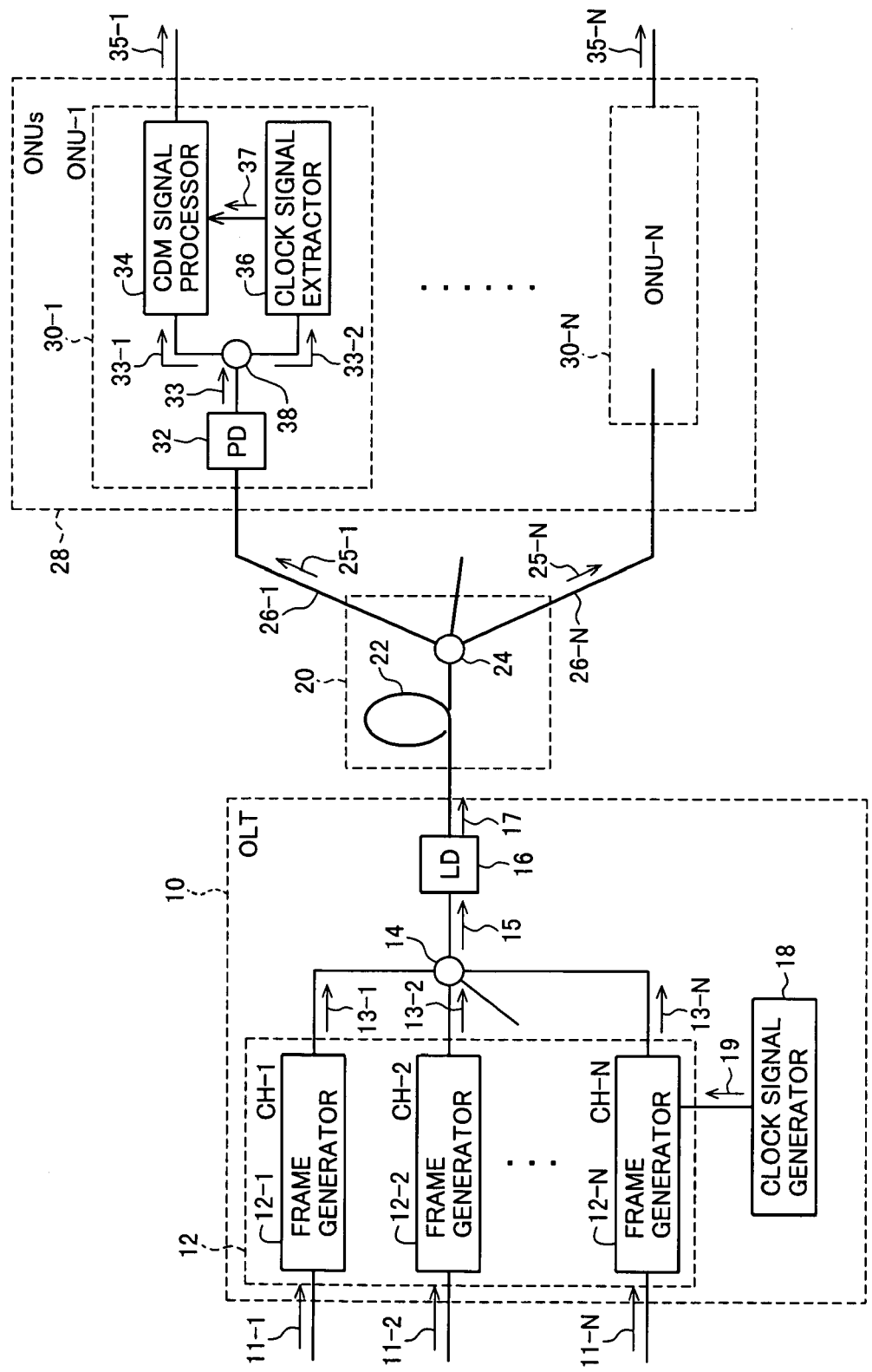
FIG. 1 is a schematic block diagram of the configuration of a CDM-PON system in an embodiment of the invention.

An embodiment of the invention will now be described with reference to the attached drawings, in which like elements are indicated by like reference characters. Repeated descriptions of like elements will be omitted. In FIGS. 1, 2, 5, and 7 optical signal paths such as optical fibers are depicted by bold lines, and electrical signal paths are depicted by thin lines. It will be appreciated that these four drawings show exemplary structures in a general and schematic manner, and that the invention is not limited to the structures shown in these drawings.

The invention can also be practiced in configurations in which the OLT and ONUs communicate over electrical signal wires, without using optical signals, or communicate by wireless transmission. In the wireless case, the OLT may include a device for converting electrical signals to radio waves and transmitting the radio waves and the ONUs may includes device for receiving the radio waves and converting the received radio waves to electrical signals. As electrical signal communication and wireless communication are familiar technologies to those skilled in the art, however, only a PON-based CDM transmitting and receiving system, believed to represent the best embodiment of the invention, will be described.

Referring to FIG. 1, the CDM-PON communication system in the illustrated embodiment comprises a CDM signal transmitting apparatus or OLT 10 and N CDM signal receiving apparatuses 30-1 to 30-N (N is an integer greater than one) that use the first to the N-th code channels, respectively, in the CDM signal. In FIG. 1, the CDM signal receiving apparatus 30-1 assigned to the first channel is denoted ONU-1; the CDM signal receiving apparatuses 30-2 to 30-N assigned to the second to the N-th code channels will be denoted ONU-2 to ONU-N, although of these ONUs, only ONU-N is shown in FIG. 1.

A suitable PON communication system using the invention comprises one CDM signal transmitting apparatus and N CDM signal receiving apparatuses, generally denoted ONU-1 to ONU-N, which conduct one-to-N communication. All N CDM receiving apparatuses having the same structure. Accordingly, ONU-1 will be described below and descriptions of ONU-2 to ONU-N will be omitted except where necessary.

The OLT 10 comprises a CDM signal transmitter 12, a clock signal generator 18, a frame combiner 14, and a semiconductor laser diode (LD) 16.

The CDM signal transmitter 12 includes frame generators 12-1 to 12-N that generate and output first-channel to Nth-channel frames 13-1 to 13-N, respectively.

The frame combiner 14 combines the frames 13-1 to 13-N output from the frame generators 12-1 to 12-N to generate and output a CDM signal frame 15 in electrical signal form. The laser diode 16 converts this CDM signal frame 15 to a CDM signal frame 17 in optical signal form and outputs the optical CDM signal frame 17.

The clock signal generator 18 supplies the CDM signal transmitter 12 with a clock signal 19 used as a reference clock when each of the frame generators 12-1 to 12-N generates a frame. The clock signal 19 is recovered from the CDM signal frame at the CDM signal receiving apparatuses 30-1 to 30-N described later and used in a decoding process, a gating process, and other processes.

After conversion to optical signal form by the laser diode 16, the CDM signal frame is sent through a passive optical network 20 to the CDM signal receiving apparatuses or ONUs 28. The passive optical network 20 comprises an optical fiber transmission path 22, a 1-to-N star coupler 24, and N branch optical fibers 26-1 to 26-N connected in a star topology. The terminals of the branch optical fibers 26-1 to 26-N are connected to respective CDM signal receiving apparatuses 30-1 to 30-N.

The CDM signal frame 17 propagates through the optical fiber transmission path 22 to the star coupler 24, where it is divided into N CDM signal frames 25-1 to 25-N, which are routed to respective CDM signal receiving apparatuses 30-1 to 30-N. The CDM signal frames 25-1 to 25-N input to CDM signal receiving apparatuses 30-1 to 30-N are multi-level digital signals having the same waveshapes as CDM signal frame 17 but only 1/Nth the signal power.

The ONUs 28, that is, the N CDM signal receiving apparatuses 30-1 to 30-N (ONU-1 to ONU-N) recover and output respective received signals 35-1 to 35-N.

The CDM signal receiving apparatuses 30-1 to 30-N all have the internal structure shown in FIG. 1 for CDM signal receiving apparatus 30-1 (ONU-1). Each signal receiving apparatus comprises a photodiode (PD) 32, a CDM signal splitter 38, a clock signal extractor 36, and a CDM signal processor 34. In CDM signal receiving apparatus 30-1, the photodiode 32 converts CDM signal frame 25-1 to a CDM signal frame 33 in electrical signal form and outputs the electrical CDM signal frame 33. The CDM signal splitter 38 receives this CDM signal frame 33 and splits it into a first frame 33-1 and a second frame 33-2.

The second frame 33-2 is input to the clock signal extractor 36, which recovers a clock signal 37 from the preamble signal included in the second frame 33-2 as described later and supplies the clock signal to the CDM signal processor 34.

Meanwhile, the first frame 33-1 is input to the CDM signal processor 34 and a decoding process, a gating process, a header removal process, and other processes are performed to recover and output the received signal 35-1.

The structure and operation of frame generator 12-1 in the CDM signal transmitter 12 will be described with reference to FIG. 2. Frame generators 12-2 to 12-N have the same structure and operate in the same way, except that they transmit different data and use different codes.

Figure 2:
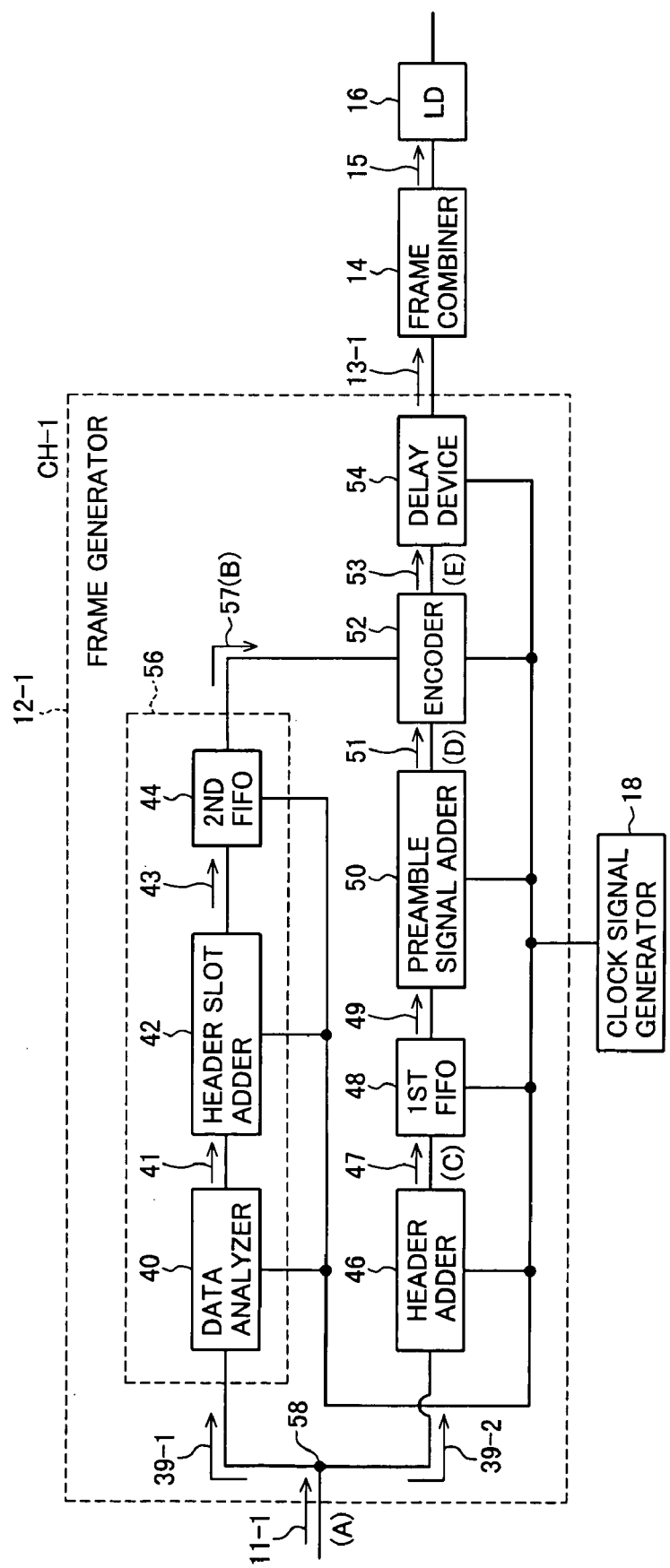
FIG. 2 is a schematic block diagram of the frame generator in FIG. 1.

Referring to FIG. 2, frame generator 12-1 comprises an encoding enable signal generator 56, a header adder 46, a first first-in first-out buffer (FIFO) 48, a preamble signal adder 50, an encoder 52, and a delay device 54. The frame generator 12-1 receives a first channel data signal 11-1 and outputs a first channel frame 13-1.

The data signal 11-1 (A) is divided by a splitter 58 into a data signal 39-1, which is input to the encoding enable signal generator 56, and a data signal 39-2, which is input to the header adder 46. Both data signals 39-1, 39-2 have the same waveshape as data signal 11-1, but only half the signal power. Therefore, both data signals 39-1 and 39-2 may be referred to below as data signal 11-1 as long as no confusion arises.

The encoding enable signal generator 56 receives the data signal 39-1 and generates and outputs an encoding enable signal 57 (B) for switching the encoder 52 between an encoding process enabled state and an encoding process disabled state. The encoding enable signal 57 (B) determines whether or not the encoder 52 executes the encoding process.

Meanwhile, data signal 39-2 is input to the header adder 46, which adds a header at the head of data signal 39-2 and outputs the resulting transmit signal 47 (C). The output transmit signal 47 (C) is input to the first FIFO buffer 48, where it is delayed by a time equivalent to the duration of the CDM signal end bit pattern, preamble signal, and preamble signal end bit pattern.

The delayed transmit signal 49 output from the first FIFO buffer 48 is input to the preamble signal adder 50, where a preamble signal and the end bit patterns are added. The resulting non-encoded signal 51 (D) is input to the encoder 52, which encodes the data and header to generate a frame 53 (E).

The frame 53 (E) is input to the delay device 54, delayed as necessary, and then output to the frame combiner 14 as frame 13-1. The frame combiner 14 also receives similar frames 13-2 to 13-N output from frame generators 12-2 to 12-N, including encoded header and data signals for the second to N-th channels, as shown in FIG. 1. For simplicity, the input of frames 13-2 to 13-N to the frame combiner 14 is not shown in FIG. 2.

The frames 13-1 to 13-N are delayed as necessary by the delay devices in the frame generators 12-1 to 12-N so that when combined by the frame combiner 14, their preamble signals are mutually aligned on the time axis.

The frame combiner 14 combines frames 13-1 to 13-N to generate and output the CDM signal frame 15. In the combined signal frame 15, the mutually aligned preamble signals and preamble signal end bit patterns are followed by the CDM signal proper, comprising the mutually superimposed encoded header and data signals for the different channels, and then by the CDM signal end bit patterns.

The encoding enable signal generator 56 comprises a data analyzer 40, a header slot adder 42, and a second FIFO buffer 44. Data signal 39-1 is input to the data analyzer 40, which determines the duration of the data segment. The data analyzer 40 outputs a pulse 41 having this duration to the header slot adder 42, which extends the pulse by the duration of the header to generate a pulse 43 having the total duration of the part of the transmit signal that is to be encoded.

The pulse 43 having this total duration is input to the second FIFO buffer 44, and then output to the encoder 52 as the encoding enable signal 57 (B) in a time slot matching the interval in which the encoder 52 receives the header and transmit data signal from the preamble signal adder 50. In the following description it will be assumed that the pulse 43 is high, so that the encoding enable signal 57 (B) is at the high logic level while the encoder 52 receives the header and transmit data signal and at the low logic level at other times. The high logic level of the encoding enable signal 57 (B) places the encoder 52 in the encoding process enabled state and the low logic level places the encoder 52 in the encoding process disabled state.

The clock signal generator 18 supplies a clock signal to the data analyzer 40, the header slot adder 42, the second FIFO buffer 44, the header adder 46, the first FIFO buffer 48, the preamble signal adder 50, the encoder 52, and the delay device 54, all of which operate in synchronization with the clock signal.

Figure 3:
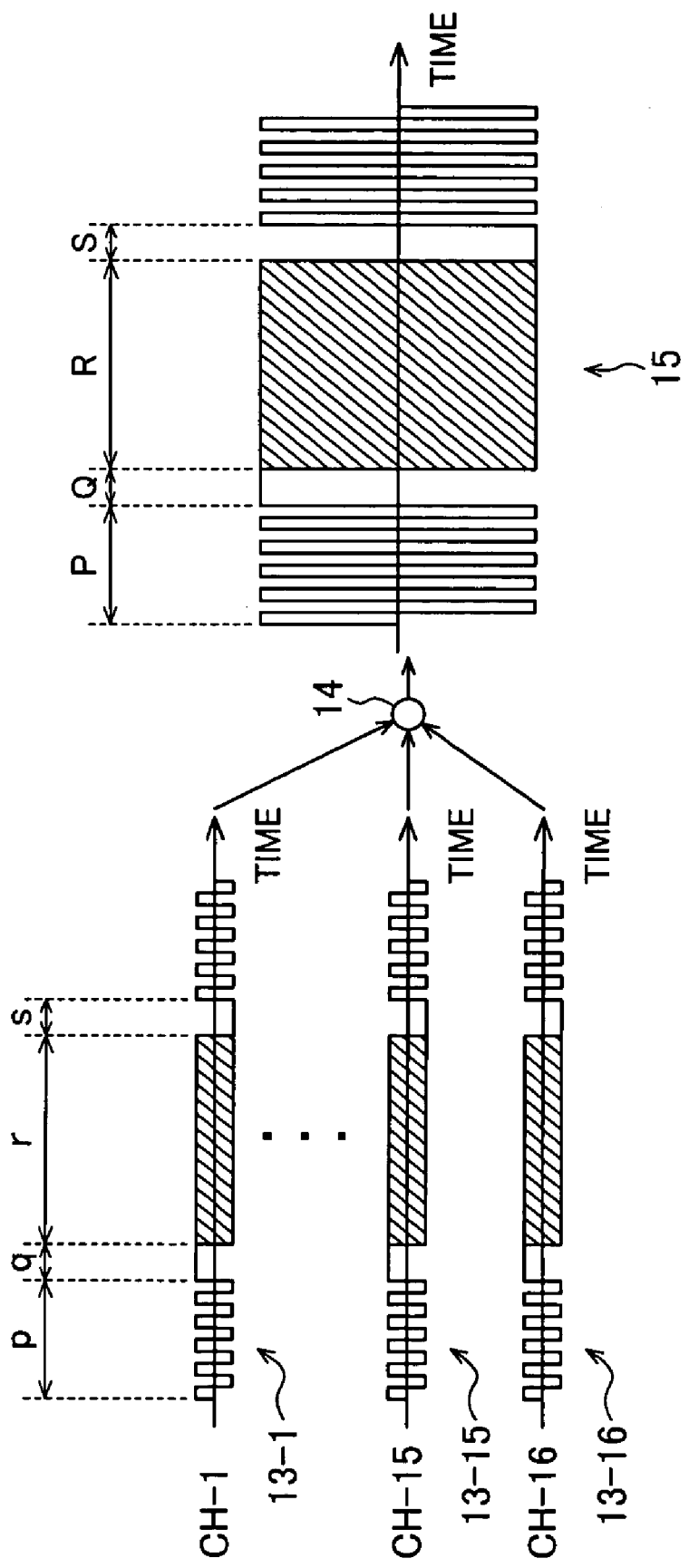
FIG. 3 is a diagram schematically illustrating the process by which frames output from the frame generators are combined into a CDM signal frame by the frame combiner.

The operation of the frame combiner 14 is illustrated in FIG. 3. N is assumed to be equal to sixteen: frames 13-1 to 13-16 output from frame generators 12-1 to 12-16 are combined by the frame combiner 14 to generate the CDM signal frame 15. The following description is also applicable to values of N other than sixteen, e.g., to N=32.

The left side of FIG. 3 shows the temporal waveforms of the frames 13-1 to 13-16 output from the frame generators 12-1 to 12-16, which are assigned to respective channels CH-1 to CH-16. Due to space limitations, only frames 13-1, 13-15, and 13-16 are actually shown. The right side of FIG. 3 shows the temporal waveform of the CDM signal frame 15 generated and output by the frame combiner 14.

Each of the frames 13-1 to 13-16 output from the frame generators 12-1 to 12-16 includes a preamble signal (p) followed by a preamble signal end bit pattern (q), then the encoded header and data signal (r) followed by the CDM signal end bit pattern (s). The CDM signal frame 15 formed by combining frames 13-1 to 13-16 includes a preamble signal (P) followed by a preamble signal end bit pattern (Q), then a CDM signal (R) and followed by the CDM signal end bit pattern (S).

Since the preamble signals (p) included in the frames 13-1 to 13-16 are added with matching phase, a bi-level digital signal (1, 0, 1, 0, . . . ) with sixteen times the original amplitude is obtained. Accordingly, the preamble signal (P) included in the CDM signal frame 15 is a bi-level digital signal having sixteen times the amplitude of the preamble signals (p) in frames 13-1 to 13-16.

As an example, the preamble signal end bit patterns (q and Q) are shown as non-return to zero (NRZ) signals with an all-one pattern (1, 1, 1). This not a limitation; a different pattern may be used if convenient. The preamble signal end bit patterns (q) included in the frames 13-1 to 13-16 are additively combined with their phases aligned, producing a preamble signal end bit pattern (Q) with the same NRZ pattern (1, 1, 1) but sixteen times the original amplitude. A NRZ signal with this bit pattern (1, 1, 1) is expressed as a constant signal power value continuing for the duration of three bits in the preamble.

The header and data signals (r) are encoded signals, also in the NRZ format, but with different headers and data in each channel. The process by which the header and data signals are encoded will now be described. The following description applies to all channels.

It will be assumed that the signal to be encoded is a bi-level data signal with values of (1, 0, 1, . . . ), and that the code used in the channel under discussion is a code sequence (1, 0, 0, 1) having a code length of four. The following description is of course applicable to data other than (1, 0, 1, . . . ) and code sequences other than (1, 0, 0, 1).

The code length is the combined number of 0's and 1's in the code sequence. The individual 0's and 1's in the code sequence are referred to as chips. When a chip is represented by an electric pulse or an optical pulse, it may be referred to as a chip pulse. The 0's and 1's may also be referred to as code values. The duration of one chip on the time axis is referred to as the chip period. The reciprocal of the chip period is the chip rate or chip rate frequency.

In encoding, the full number of chips in the code length are used to encode each bit of data. The code is generated repetitively at a rate such that the code sequence (1, 0, 0, 1) is aligned on the time axis with each bit of the non-encoded transmit signal. The code chip rate, that is, the chip rate frequency, is therefore four times the bit rate of the non-encoded transmit signal.

The encoding process can be described as a multiplication process in which the data signal D is multiplied by the code C to obtaining their product D×C. For this purpose, it is convenient to switch from the conventional bit notation in which the data signal is represented as (1, 0, 1, . . . ) to an algebraic notation in which the bit values are represented as '1' and '−1', the data signal thus becoming (1, −1, 1, . . . ). Similarly, the code (1, 0, 0, 1) used for encoding the data signal becomes (1, −1, −1, 1).

In the encoding process, each bit of the data signal is multiplied by the code (1, −1, −1, 1) to obtain a four-chip encoded sequence. The first bit D (1) is accordingly encoded as follows:

$$(1) \times (1, -1, -1, 1) = (1 \times 1, 1 \times -1, 1 \times -1, 1 \times 1)$$
$$= (1, -1, -1, 1)$$

The second bit D (−1) is encoded as follows:

$$(-1) \times (1, -1, -1, 1) = (-1 \times 1, -1 \times -1, -1 \times -1, -1 \times 1)$$
$$= (-1, 1, 1, -1)$$

The third bit encoded like the first bit. Accordingly, the encoded signal obtained by encoding the data signal is:
((1, −1, −1, 1), (−1, 1, 1, −1), (1, −1, −1, 1) . . . )=(1, −1, −1, 1, −1, 1, 1, −1, 1, −1, −1, 1, . . . )

This algebraic expression, using '−1' and '1', may be rewritten in ordinary digital signal notion using '0' and '1' as (1, 0, 0, 1, 0, 1, 1, 0, 1, 0, 0, 1, . . . ).

In this embodiment, the encoded signal is processed as an electrical signal in which a '1' corresponds to the presence of an electrical pulse and a '0' or '−1' corresponds to the absence of an electrical pulse. After the encoded signals are combined into a CDM signal, they are converted to an optical pulse signal.

As described above, the encoded data signal is a sequence of chips that are transmitted at the chip rate, rather than the original bit rate. It is therefore preferable to set the bit rates of the preamble signal (p), preamble signal end bit pattern (q), and CDM signal end bit pattern (s) equal to the chip rate of the encoded signal.

Since the encoded signals (r) differ from channel to channel, even it they are mutually aligned in phase by the frame combiner 14, the combined CDM signal R is not a bi-level digital signal but rather a multi-level digital signal with more than two possible signal values. In FIG. 3, for simplicity, the multi-level signal waveforms of the encoded header and data signals (r) in frames 13-1 to 13-16 and the CDM signal R in the CDM signal frame 15 are not explicitly shown but are indicated by hatched rectangles.

The CDM signal end bit patterns (s and S) are shown as non-return to zero (NRZ) signals with an all-zero pattern (0, 0, 0). This not a limitation; another end bit pattern may be used if convenient. The CDM signal end bit patterns (s) included in the frames 13-1 to 13-16 are additively combined with their phases aligned, producing a CDM signal end bit pattern (S) with the same NRZ pattern (0, 0, 0), expressed in FIG. 3 as a zero constant signal power value continuing for the duration of three bits in the preamble or three chips in the encoded part of the signal.

If the encoded segments (r) in different channels have different lengths, longer encoded segments may partially overlap the end bit patterns (s) following shorter encoded segments. In this case, the time slot of the CDM signal end bit pattern (S) in the CDM signal frame begins when the encoded segments (r) of all channels have ended.

Returning now to the process by which a frame 53 is generated from the data signal on the first channel input to the frame generator 12-1, this process will be described with reference to FIGS. 4A to 4E, in which the horizontal axis represents time in arbitrary units and the vertical axis represents signal power in arbitrary units. A similar process is used in the other channels.

Figure 4:
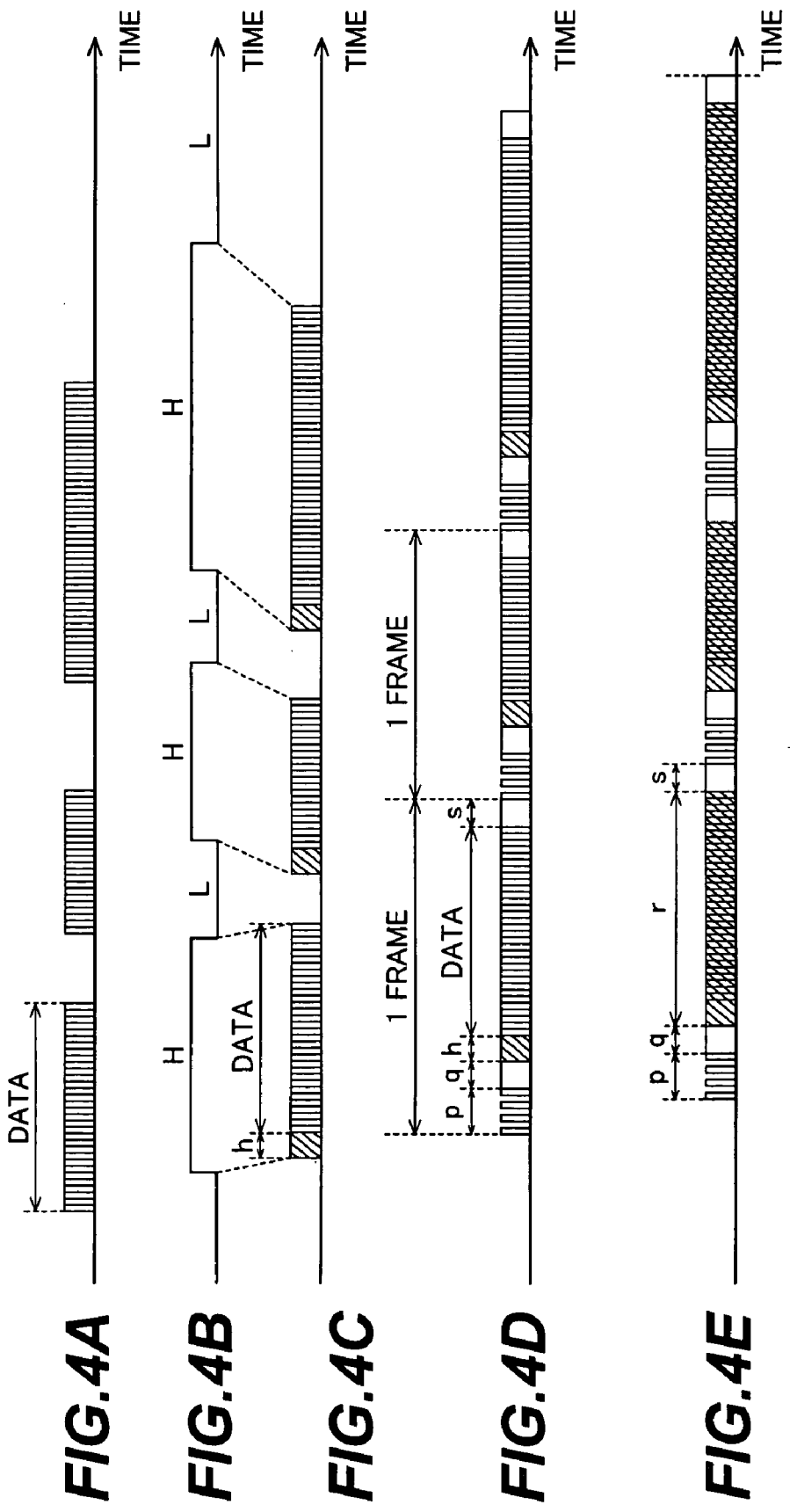
FIGS. 4A to 4E are waveform diagrams illustrating the frame generation process.

FIG. 4A shows the waveform of a data signal on the first channel; FIG. 4B shows the waveform of the encoding enable signal; FIG. 4C shows the waveform of the transmit signal output from the header adder 46; FIG. 4D shows the waveform of the non-encoded transmit signal including the preamble signal; FIG. 4E shows the waveform of the encoded frame output from the frame generator 12-1.

In FIG. 4A, three segments of data are to be transmitted. Each segment is a bi-level digital signal in NRZ format, representing binary values of '0' and '1' ('−1' and '1' in algebraic notation). The data segments may have different lengths and may be spaced at different intervals on the time axis, as shown.

The invention may also be practiced with data segments of constant length and/or spacing.

In FIG. 4B, the waveform of the encoding enable signal 57 generated and output from the encoding enable signal generator 56 is shown. The encoding enable signal 57 has, for example, a voltage level corresponding to a logic '1' in the intervals during which the encoder 52 executes the encoding process and a voltage level corresponding to logic '0' in the intervals during which the encoder 52 does not execute the encoding process. In FIG. 4B, the voltage level corresponding signal '1' is denoted 'H' (high), and the voltage level corresponding to '0' is denoted 'L' (low). The 'H' and 'L' voltage levels may be any voltage levels necessary for enabling and disabling the encoder 52.

In FIG. 4C, the header adder 46 has added a header (h) at the head of each segment of transmit data. The header includes identification information such as, for example, a channel number and is encoded by the encoder 52 together with the transmit data. The time duration during which the encoding enable signal 57 is high is the total duration of the header and the transmit data in each segment.

In FIG. 4D, the preamble signal adder 50 has added a preamble signal (p), preamble signal end bit pattern (q), and CDM signal end bit pattern (s) to the header (h) and transmit data in each segment to configure the segment as a non-encoded frame. The first FIFO buffer 48 feeds the header (h) and transmit data to the preamble signal adder 50 after the preamble signal adder 50 generates the preamble signal (p) and preamble signal end bit pattern (q). At the end of the transmit data, the preamble signal adder 50 generates the CDM signal end bit pattern (s) by, for example, leaving the non-encoded signal at the '0' level from the end of data signal to the end of the frame, that is, until the beginning of the preamble signal (p) in the next frame.

In FIG. 4E, the encoder has encoded the header and transmit data (r) to generate an encoded frame 53 output from the encoder 52. The encoding of the header and data is indicated by hatching.

FIG. 4B indicates the length of the high and low pulses in the encoding enable signal 57, but not their alignment on the time axis. In actual operation, the high pulses are aligned with the header and data segments (r) in FIG. 4E.

Since the data segments have different lengths, the data analyzer 40 scans the data signal to determine the length of each segment. This enables the header slot adder 42 and the second FIFO buffer 44 to generate an encoding enable signal 57 in which the high logic level is output for the time necessary to encode each header and data segment in the frame output from the preamble signal adder 50.

Figure 5:
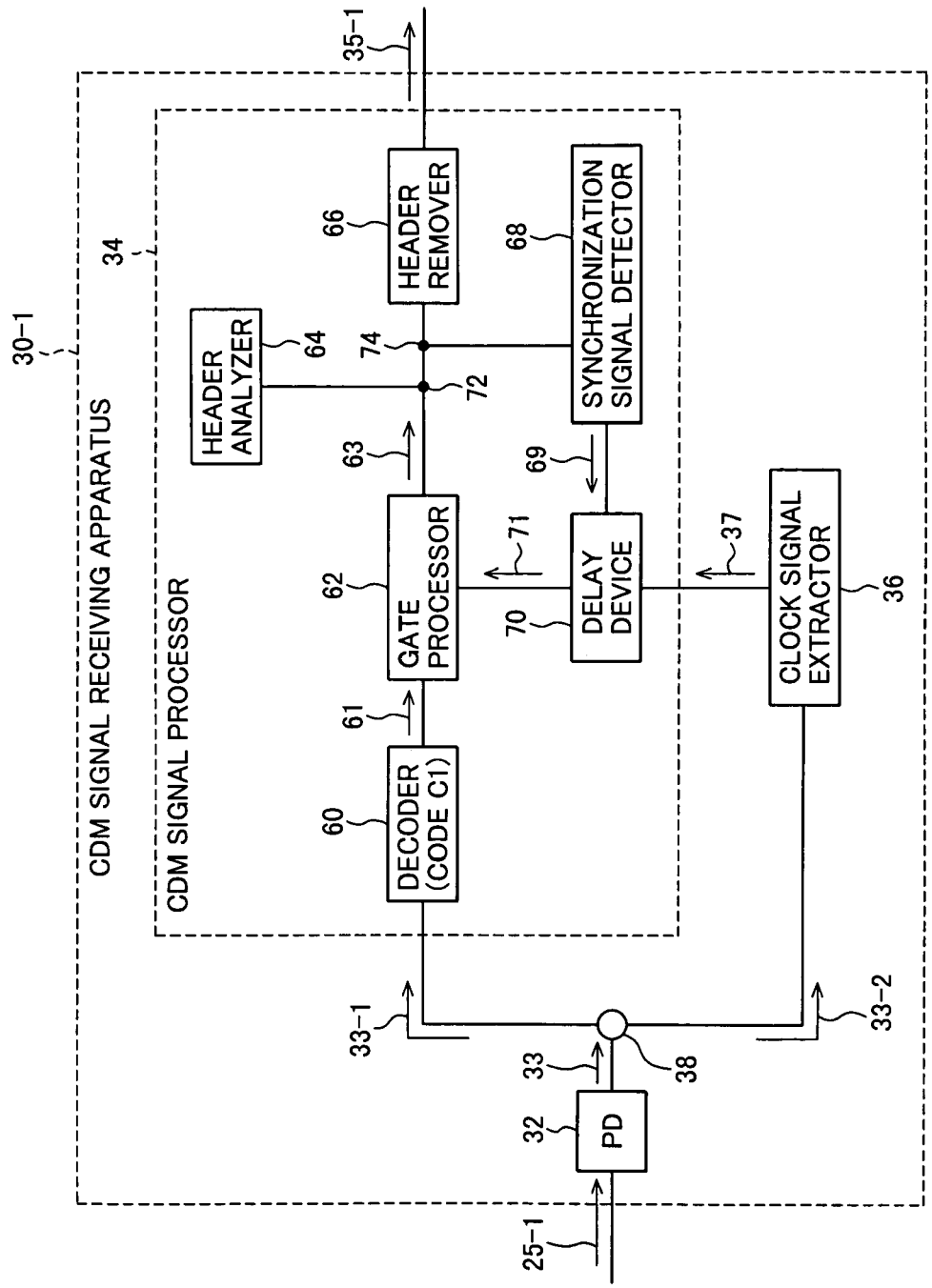
FIG. 5 is a schematic block diagram illustrating the configuration of the CDM signal receiving apparatus.

The structure and operation of CDM signal receiving apparatus 30-1 (ONU-1) will be described with reference to FIG. 5. The other CDM signal receiving apparatuses 30-2 to 30-N have the same structure and operate in the same way, except for using different codes.

As noted above, CDM signal receiving apparatus 30-1 comprises a photodiode 32, CDM signal splitter 38, CDM signal processor 34, and clock signal extractor 36. The photodiode 32 converts an optical CDM signal frame 25-1 to a CDM signal frame 33 in electrical signal form and outputs the electrical CDM signal frame 33. The CDM signal splitter 38 splits the electrical CDM signal frame 33 into a first frame 33-1 and second frame 33-2, which are input to the CDM signal processor 34 and the clock signal extractor 36, respectively.

The CDM signal processor 34 receives the first frame 33-1 and, in the CDM signal time slot R shown in FIG. 3, decodes the CDM signal R to recover the received signal 35-1.

The clock signal extractor 36 receives the second frame 33-2 and, in the preamble time slot P shown in FIG. 3, recovers the clock signal 37 from the preamble signal P.

The CDM signal processor 34 comprises a decoder 60, a gate processor 62, a header analyzer 64, a header remover 66, a synchronization signal detector 68, and a delay device 70. The decoder 60 uses a code C1 assigned to the first channel.

The CDM signal processor 34 generates the received signal 35-1 from the first frame 33-1 by the following steps.

The first frame 33-1 is first input to the decoder 60 and decoded, and the decoded frame is output as a received data signal frame 61.

The received data signal frame 61 includes noise components such as the preamble and end bit patterns surrounding the received data. These noise components are removed by the gate processor 62. The gate processor 62 passes the remaining part of the frame, including the encoded header and data as a received data signal frame 63. The received data signal frame 63 is input to the header remover 66, the header is removed, and the data are output as the received signal 35-1 on the first channel.

The gate processor 62 executes the gating process with reference to a synchronization signal 71 output from the delay device 70. The delay device 70 adjusts the phase of a synchronization signal 69 output from the synchronization signal detector 68 and outputs the synchronization signal 71 so that the window of the gate processor 62 opens in synchronization with the data in the first channel.

The header analyzer 64 taps the received data signal frame 63 through a splitter 72, analyzes the header in the received data signal frame 63, and identifies the frame as having been transmitted from the OLT 10.

The synchronization signal detector 68 taps the received data signal frame 63 through another splitter 74, generates a synchronization signal 69 from the received data signal frame 63, and outputs the synchronization signal 69.

The clock signal 37 extracted by the clock signal extractor 36 is supplied to the delay device 70. The delay device 70 adjusts the phase of the synchronization signal 69 according to the clock signal 37, and supplies the synchronization signal 71 to the gate processor 62 so that the window of the gate processor 62 opens in correct synchronization with the header and data interval in the frame. The timing of the opening of the gate processor's window is determined with reference to the clock signal 37 extracted by the clock signal extractor 36.

In this way, the CDM signal processor 34 receives and decodes the first frame 33-1, and recovers and outputs the received signal 35-1.

Since the both the first and second frames 33-1, 33-2 are generated by splitting the power of the CDM signal frame 33, although their power is reduced, they have the same waveshape as the CDM signal frame 33. Accordingly, in the following description, both frames 33-1 and 33-2 may be referred to simply as CDM signal frames.

Figure 6:
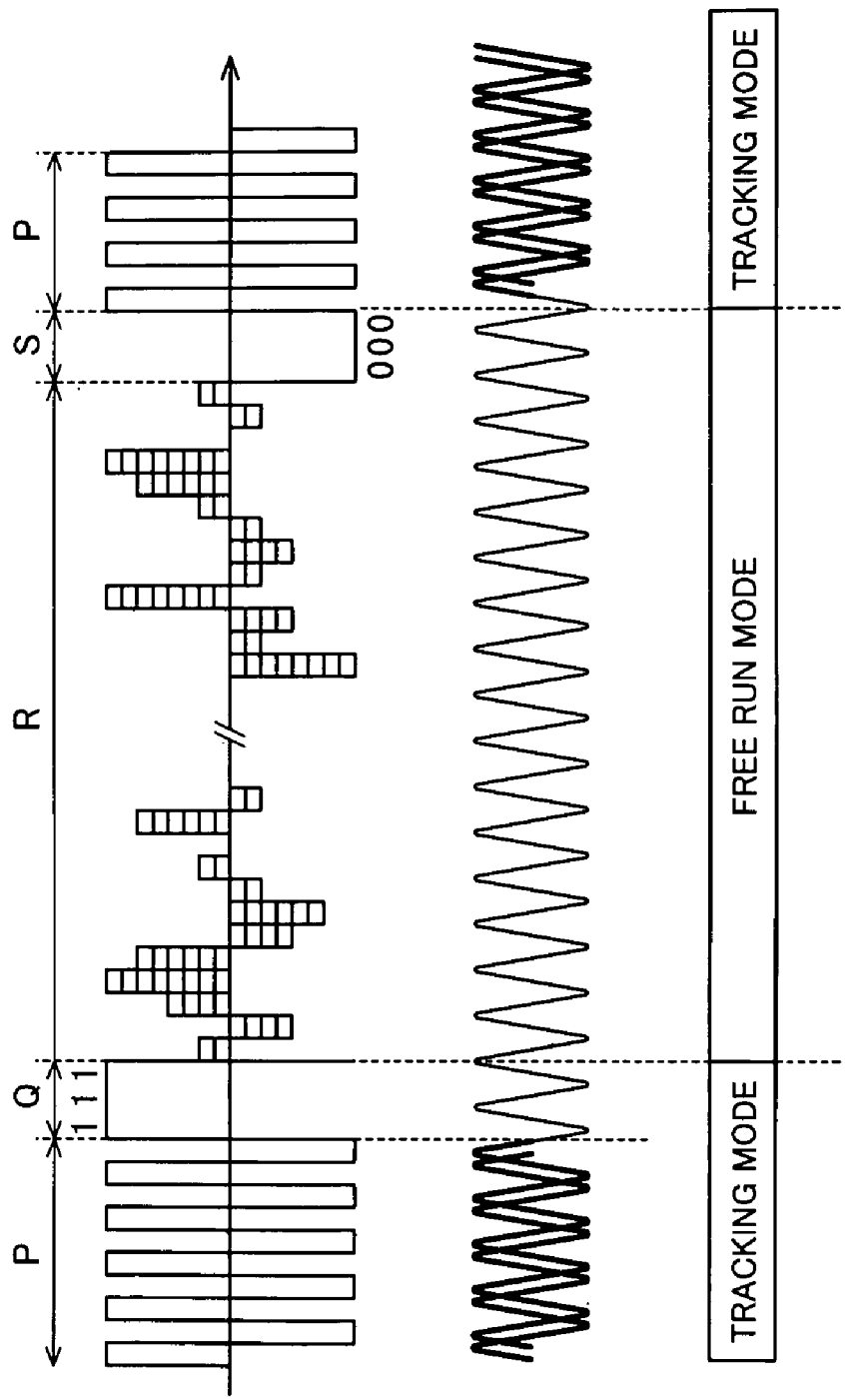
FIGS. 6A to 6C schematically illustrate the relationship between the configuration of a CDM signal frame, the temporal waveform of the clock signal, and the tracking and free run modes of the clock signal extractor.

FIGS. 6A to 6C illustrate the relationships among the frame structure, the clock waveform, and the tracking and free run modes. FIG. 6A illustrates the detailed configuration of a CDM signal frame; FIG. 6B schematically shows the temporal waveform of the clock signal recovered by the clock signal extractor; FIG. 6C shows the time intervals in which the clock signal extractor operates in the tracking and free run modes.

The CDM signal frame 15 output from the frame combiner 14 includes the preamble signal P, the preamble signal end bit pattern Q, the CDM signal R, and the CDM signal end bit pattern S, in this order. Since the CDM signal is a signal generated by combining, in the same time slot on the time axis, the encoded signals (r) included in frames 13-1 to 13-16, it is a multi-level digital signal as shown in FIG. 6A. The multi-level part R in FIG. 6A corresponds to the hatched part R in FIG. 3.

The preamble signal P is a bi-level digital signal (1, 0, 1, 0, . . . ) generated by combining, in the same time slot on the time axis, the preamble signals (p) in the frames 13-1 to 13-16 and therefore having an amplitude sixteen times the amplitude of the preamble signals p. As explained in connection with FIG. 3, the preamble signal end bit pattern Q is an NRZ format signal (1, 1, 1) generated by combining, in the same time slot on the time axis, the preamble signal end bit patterns (q) in frames 13-1 to 13-16 and having a signal power sixteen times the signal power of the preamble signal end bit patterns (q). The CDM signal end bit pattern S is an NRZ format signal (0, 0, 0) generated by combining, in the same time slot on the time axis, the CDM signal end bit patterns (s) in the frames 13-1 to 13-16 and having a signal power sixteen times the signal power of the CDM signal end bit patterns (s).

As shown on the right side of FIG. 3 and in FIG. 6A, the CDM signal frame 15 output from the frame combiner 14 is a frame including the preamble signal P, the preamble signal end bit pattern Q, the CDM signal R, and the CDM signal end bit pattern S as a single set.

As indicated schematically by the waveform in FIG. 6B, the clock signal 37 output from the clock signal extractor 36 is brought into phase with the CDM signal frame 15 in the time slot of the preamble signal P, during which the clock signal extractor 36 operates as a PLL circuit and locks onto the phase of the preamble. In the time slots of the preamble signal end bit pattern Q, the CDM signal R, and the CDM signal end bit pattern S, the clock signal 37 maintains this phase without further adjustment.

As shown in FIG. 6C, the clock signal extractor 36 continues to operate in the tracking mode during the time slot of the preamble signal end bit pattern Q, but as this bit pattern Q consists of all 1's, there are no features to lock onto; the tracking operation effectively ends at the end of the preamble signal P. During the CDM signal interval R and CDM signal end bit pattern S, the clock signal extractor 36 is disabled from executing the tracking operation, so it does not attempt to lock in phase with the multi-level CDM signal.

The structure and operation of the clock signal extractor 36 will be described with reference to FIG. 7. The clock signal extractor 36 may be implemented in a Vertex-II Pro field programmable gate array (FPGA), available from Xilinx Inc., of San Jose, Calif.

Figure 7:
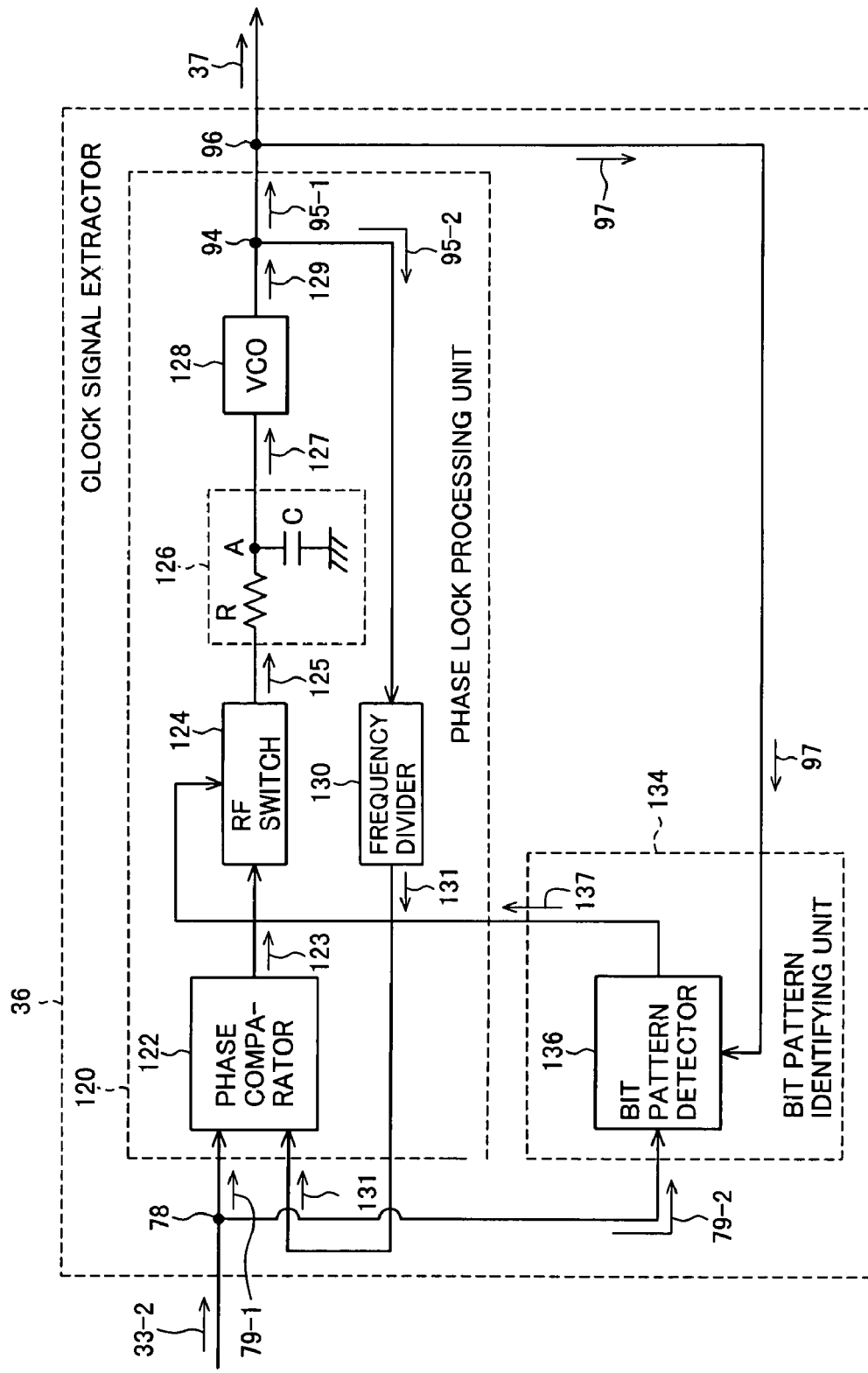
FIG. 7 is a schematic block diagram illustrating the configuration of the clock signal extractor.

Referring to FIG. 7, the clock signal extractor 36 comprises a phase lock processing unit 120 and a bit pattern identifying unit 134. The second frame 33-2 is split into CDM signal frames 79-1 and 79-2 by a splitter 78. CDM signal frame 79-1 is input to the phase lock processing unit 120 and CDM signal frame 79-2 is input to the bit pattern identifying unit 134. If the clock signal extractor 36 is implemented in a Xilinx Vertex-II Pro FPGA or similar device, the bit pattern identifying unit 134 and bit pattern detector 136 may both be integrated into a single microelectronic chip.

The phase lock processing unit 120 comprises a phase comparator 122, an RF switch 124, a loop filter 126, a VCO 128, and a frequency divider 130, all of which, except for the RF switch 124, are found in conventional PLL circuits. The invented PLL circuit differs from a conventional PLL circuit only in that the RF switch 124 is added.

The phase comparator 122 outputs a signal 123 to the RF switch 124. The RF switch 124 outputs a signal 125 to the loop filter 126. The loop filter 126 outputs a control voltage signal 127 to the VCO 128. The VCO 128 outputs an extracted clock signal 129.

The clock signal 129 output from the VCO 128 is split by a splitter 94 into clock signals 95-1 and 95-2. Clock signal 95-1 is input to another splitter 96 and split into clock signals 97 and 37. Clock signal 37 is supplied to the CDM signal processor 34 as the clock signal recovered by the clock signal extractor 36. Clock signal 95-2 is input to the frequency divider 130, divided in frequency, and output as a frequency-divided clock signal 131. The frequency-divided clock signal 131 is input to the phase comparator 122 as a phase comparison signal to be compared with the CDM signal frame 79-1. Clock signal 97 is input to the bit pattern detector 136 and operates as a reference clock signal for the bit pattern detector 136.

The bit pattern detector 136 generates a mode switching signal 137 that rises on input of the CDM signal end bit pattern S (0, 0, 0) and falls on input of the preamble signal end bit pattern Q (1, 1, 1), and supplies the mode switching signal 137 to the RF switch 124. The RF switch 124 opens, blocking the signal 123 output from the phase comparator 122, at the rise of the mode switching signal 137 and closes, resuming output of the signal 123 output from the phase comparator 122 as signal 125 to the loop filter 126, at the fall of the mode switching signal 137. The HVC131 antenna switch manufactured by Renesas Technology Corporation of Tokyo, Japan, for example, may be used as the RF switch 124. The HVC131 is an RF switch using a PIN diode.

While the phase comparator 122 is operating in the free run mode, the output terminal of the RF switch 124 is in a high impedance state and the capacitor C in the loop filter 126 cannot discharge through the RF switch 124. The VCO 128 must have a sufficiently high input impedance, preferably at least 1 MΩ, that leakage of charge into the VCO 128 does not reduce the charge of the capacitor C significantly, so that the voltage at point denoted A in the loop filter 126 is maintained at a substantially constant level and does not decrease.

While the phase comparator 122 is operating in the tracking mode, the RF switch 124 is in the conductive state. Therefore, the output signal 123 from the phase comparator 122 passes directly through to the loop filter 126.

The switching of the operating modes of the phase lock processing unit 120 will now be described with reference to FIGS. 8A and 8B. FIG. 8A shows the waveform of a CDM signal frame input to the phase comparator; FIG. 8B shows the waveform of the mode switching signal 137. In both drawings, the horizontal axis represents time in arbitrary units, and the vertical axis represents signal amplitude or voltage level in arbitrary units. FIG. 8A is a simplified representation of the frame shown in FIG. 6A.

The mode switching signal 137, which is supplied from the bit pattern detector 136 to the RF switch 124, goes high when the bit pattern detector 136 detects the CDM signal end bit pattern S (0, 0, 0) and goes low when the bit pattern detector 136 detects the preamble signal end bit pattern Q (1, 1, 1).

When the mode switching signal 137 goes high, the RF switch 124 blocks the signal 123 output from the phase comparator 122 and the free run mode begins. When the mode switching signal 137 goes low, the RF switch 124 resumes the output of signal 123 as signal 125 to the loop filter 126 and the tracking mode begins.

In the free run mode, accordingly the signal 123 output from the phase comparator 122 is ignored and the VCO 128 in the PLL circuit continues to oscillate at the frequency to which it was set at the end of the tracking mode. During the free run interval, the CDM signal in the CDM signal frame is decoded and the received signal is recovered.

Although only one embodiment has been described, those skilled in the art will recognize that other embodiments and variations are possible within the scope of the invention, which is defined in the appended claims.

What is claimed is:

1. A code division multiplex (CDM) communication system comprising a transmitting apparatus and a receiving apparatus, wherein:

the transmitting apparatus includes
a plurality of frame generators for encoding and framing respective data signals and outputting resulting frames, and
a frame combiner for combining the frames output from the plurality of frame generators to generate a multiplexed frame including a preamble signal followed by a preamble signal end bit pattern followed by a CDM signal followed by a CDM signal end bit pattern in respective time slots and outputting the multiplexed frame; and the receiving apparatus includes
a clock signal extractor for receiving the multiplexed frame, extracting a clock signal from the preamble signal therein, and outputting the extracted clock signal during at least the time slot of the CDM signal, and
a CDM signal processor for receiving the multiplexed frame and the extracted clock signal and decoding the CDM signal in synchronization with the extracted clock signal to obtain a received data signal.

2. The CDM communication system of claim 1, wherein each of the plurality of frame generators comprises:
a header adder for adding a header to the data signal;
a first first-in first-out (FIFO) buffer for reserving the time slots for the CDM signal end bit pattern, the preamble signal, and the preamble signal end bit pattern;
a preamble signal adder for adding at least the preamble signal to the header and the data signal to generate a non-encoded signal;
an encoding enable signal generator for generating and outputting an enable signal having an enabling state and a disabling state, the enabling state coinciding with the header and the data signal in the non-encoded signal; and
an encoder for encoding the non-encoded signal while the enable signal is in the enabling state, thereby encoding the header and the data signal, to generate the frame.

3. The CDM communication system of claim 2, wherein the encoding enable signal generator comprises:
a data analyzer for determining a duration of the data signal;
a header slot adder for adding a duration of the header to the duration of the data signal to determine a duration of the enabling state of the enable signal; and
a second FIFO buffer for adjusting an output timing of the enable signal.

4. The CDM communication system of claim 1, wherein the clock signal extractor operates in a tracking mode by extracting the clock signal from the multiplexed frame in at least the time slot of the preamble signal, and operates in a free run mode by continuing to output the clock signal during at least the time slot of the CDM signal.

5. The CDM communication system of claim 4; wherein the clock signal extractor comprises:
- a phase lock processing unit for extracting the clock signal from the preamble signal of the multiplexed frame in the tracking mode, and outputting the extracted clock signal in both the tracking mode and the free run mode; and
- a bit pattern identifying unit for generating a mode switching signal by detecting the preamble signal end bit pattern and the CDM signal end bit pattern and supplying the mode switching signal to the phase lock processing unit to switch the phase lock processing unit between the tracking mode and the free run mode.

6. The CDM communication system of claim 5, wherein:
- the phase lock processing unit comprises a phase comparator, a high-frequency switch, a loop filter, a voltage controlled oscillator (VCO), and a frequency divider;
- the phase comparator, the loop filter, the VCO, and the frequency divider constitute a phase locked loop in which the phase comparator supplies an output signal to the loop filter and the loop filter supplies a control voltage to the VCO;
- the mode switching signal assumes a first state when the bit pattern identifying unit detects the CDM signal end bit pattern and assumes a second state when the bit pattern identifying unit detects the preamble signal end bit pattern; and
- the high-frequency switch halts supply of the output signal from the phase comparator to the loop filter when the mode switching signal is in the second state and resumes signal output from the phase comparator to the loop filter when the mode switching signal returns to the first state.

* * * * *